United States Patent [19]
Liu et al.

[11] Patent Number: 5,371,440
[45] Date of Patent: Dec. 6, 1994

[54] HIGH FREQUENCY MINIATURE ELECTRONIC BALLAST WITH LOW RFI

[75] Inventors: Rui Liu; Wen-Jian Gu, both of Croton-on-Hudson, N.Y.

[73] Assignee: Philips Electronics North America Corp., New York, N.Y.

[21] Appl. No.: 174,076

[22] Filed: Dec. 28, 1993

[51] Int. Cl.⁵ .............................................. H05B 37/02
[52] U.S. Cl. .................................. 315/209 R; 315/307; 315/247; 315/224; 315/DIG. 5
[58] Field of Search ................... 315/224, 219, 209 R, 315/223, 307, 174, 175, DIG. 5, DIG. 7, 247

[56] References Cited

U.S. PATENT DOCUMENTS 4,700,113 10/1987 Stupp et al. .................. 315/219 X
5,142,201 8/1992 Wessels ........................ 315/209 R

FOREIGN PATENT DOCUMENTS 0439861 8/1991 European Pat. Off. .

Primary Examiner—Robert J. Pascal
Assistant Examiner—Haissa Philogene
Attorney, Agent, or Firm—Bernard Franzblau

[57] ABSTRACT

A miniature electronic ballast with low radio frequency interference (RFI) for operating a discharge lamp by amplitude modulation and two frequency operation. A high frequency operating voltage (approximately 1-2 MHz) is generated and is amplitude modulated at a relatively lower frequency (approximately 20-50 KHz). This operating voltage is demodulated to suppress the high frequency carrier voltage (1-2 MHz) and the low frequency modulating signal (20-50 KHz) itself is applied to the discharge lamp to energize same. The use of the high frequency operating voltage makes it possible to reduce the size of the magnetic components in the electronic ballast, whereas the low frequency voltage actually applied to the discharge lamp avoids problems of RFI that otherwise would occur if the high frequency carrier voltage itself was applied to the discharge lamp.

13 Claims, 4 Drawing Sheets

HIGH FREQUENCY MINIATURE ELECTRONIC BALLAST WITH LOW RFI

BACKGROUND OF THE INVENTION

This invention relates to an electronic ballast circuit for operation of an electric discharge lamp, and more particularly to a miniature electronic ballast that produces a relatively small amount of radio frequency interference (RFI).

It is now common practice to operate many types of discharge lamps at a high frequency in order to achieve the numerous advantages of such high frequency operation. Therefore, the operating frequencies of dc-to-dc converters have been increased to the MHz range, resulting in a significant reduction of both size and weight of the overall power supply arrangement. This is due to the fact that the size and weight of a magnetic component is inversely proportional to its operating frequency and the magnetic components are the bulky space consuming components in any power supply. Therefore, an electronic ballast can be miniaturized if its operating frequency is increased because the bulky components in an electronic ballast are similarly the magnetic components such as inductors and transformers.

In principle, therefore, it should be possible to reduce or miniaturize the size of an electronic ballast circuit for discharge lamps by increasing the operating frequency of the system. However, in the case where the frequency of the lamp current and voltage is the same as the operating frequency of the electronic ballast, the problem of radio frequency interference (RFI) arises, especially if the operating frequency is increased to approximately 100 KHz or higher. At these frequencies, the influence of parasitic parameters of outgoing wires will have a considerable effect, which will degrade the performance of an electronic ballast. In addition, the discharge lamp itself will radiate energy and thus will also provide significant radio frequency interference.

One prior art circuit for operating a low-pressure mercury discharge lamp with a high-frequency pulsatory current is shown in European Patent Application 0 439 861 A1. This patent application describes an electronic ballast circuit for operating a low pressure mercury discharge lamp with a sinusoidal amplitude modulated high frequency current. A carrier frequency of approximately 50 KHz is amplitude modulated and the high frequency amplitude modulated current is applied directly to the discharge lamp. The amplitude modulation in this patent is employed in order to keep the light color of the low pressure mercury discharge lamp from shifting due to dimming of the lamp because of adjustment of the amplitude of the amplitude modulated lamp current.

U.S. Pat. No. 5,142,201 (Aug. 25, 1992) describes a circuit including a dc/ac converter for supplying power to a high frequency electrodeless discharge lamp from a dc voltage source. This type of lamp is designed to operate at high frequencies, usually in the megahertz (MHz) range. This circuit does not use amplitude modulation since it is not required for the electrodeless lamp. However, operation of the lamp at such high frequencies will cause severe electromagnetic interference (EMI) and radio frequency interference problems. Since the electrodeless lamp has to be operated at high frequency (MHz range) in order to generate light, expensive EMI and RFI suppression circuits have to be employed so as to reduce the amount of EMI and RFI to acceptable levels.

SUMMARY OF THE INVENTION

It is therefore an object of the present invention to provide a miniaturized electronic ballast system by increasing the ballast operating frequency while maintaining the radio frequency interference generated by the system at acceptably low levels.

The foregoing and other objects of the invention are achieved by a new system concept in which the operating frequency of the electronic ballast is increased, for example, above 1 MHz in order to reduce the size of the electronic ballast while keeping the frequency of the lamp current and voltage at a relatively low value, for example, 20–50 KHz, in order to avoid RFI problems and the parasitic effects of outgoing wires. This is accomplished by employing a novel amplitude modulation/demodulation technique which will be described in detail below.

A high frequency inverter is employed to provide a high frequency current (1 MHz) that is amplitude modulated by a 20–50 KHz rectified sine wave. A demodulator is used to obtain the envelope of the amplitude modulated high frequency ac current in order to drive the lamp with a 20–50 KHz lamp current. As a result, the operating frequency of the high frequency inverter and the electronic ballast is 1 MHz (or above), thus reducing the size of the magnetic components and hence the overall size of the electronic ballast. At the same time, the frequency of the lamp current and voltage is in the range of only 20 KHz to 50 KHz so that radio frequency interference is minimized.

In a preferred form of the invention, the dc-to-ac inverting operation and the amplitude modulation are accomplished in one and the same circuit. In this case, the control circuit performs both output regulation and amplitude modulation, thereby providing a system having a high efficiency.

BRIEF DESCRIPTION OF THE DRAWINGS

The invention will now be described in greater detail in connection with certain preferred embodiments thereof as shown in the accompanying drawings, in which.

DESCRIPTION OF THE PREFERRED EMBODIMENTS

Figure 1:
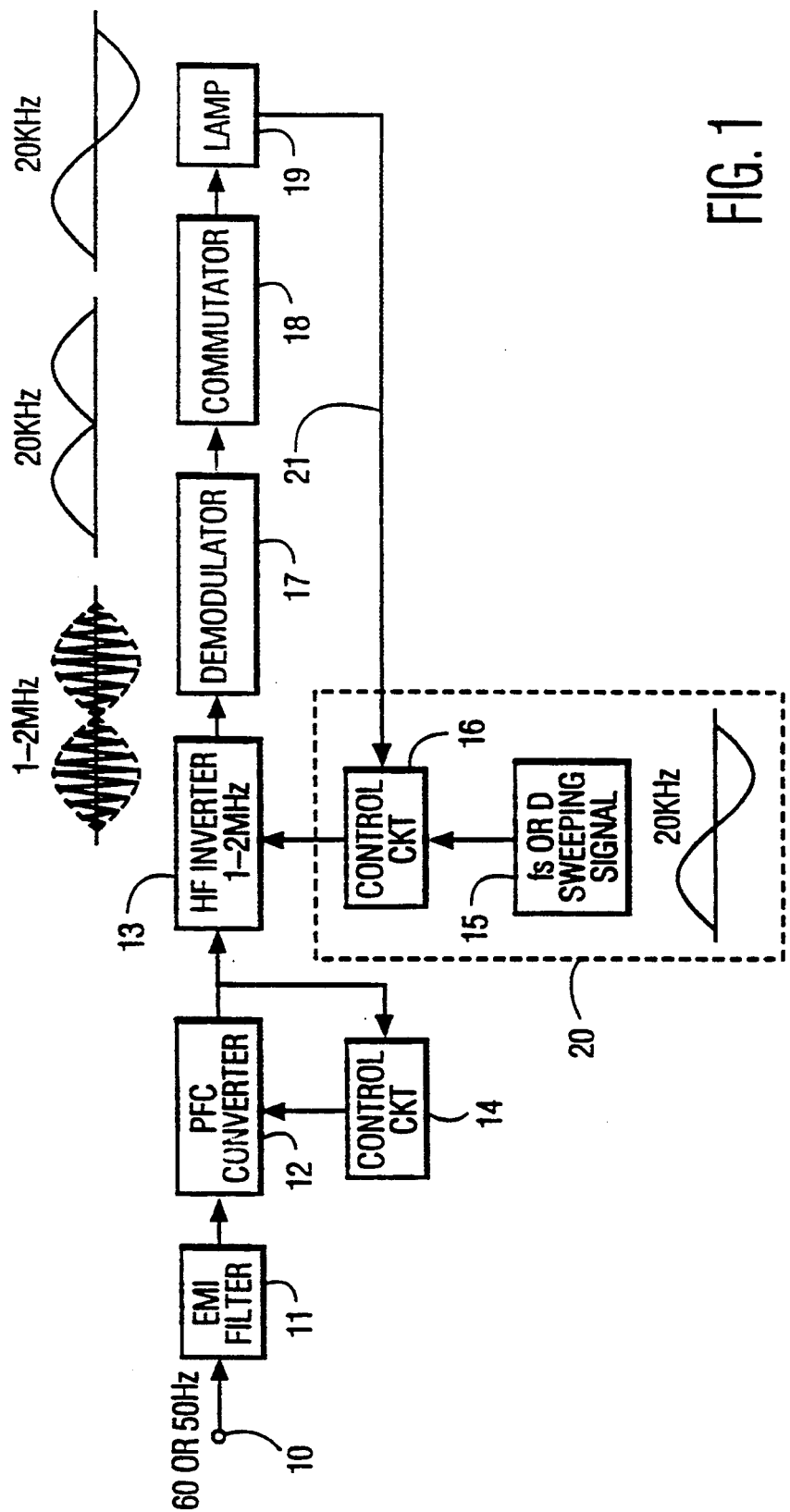
FIG. 1 shows a block diagram of the electronic ballast system of the present invention.

FIG. 1 shows a schematic block diagram of an electronic circuit that implements the present invention. An input terminal 10 is provided for receiving a 50 Hz or 60 Hz AC supply voltage for operation of the system. The input terminal is coupled directly to the input of an electromagnetic interference (EMI) filter 11. The EMI filter is used to filter out any high frequency harmonic components generated by the high frequency operation of the system.

The output of the EMI filter 11 is then coupled to the input of a power factor correction (PFC) converter 12. The power factor correction circuit is an intermediate stage which shapes its input current into a rectified sine wave which is in phase with the rectified line voltage in order to achieve a high power factor and a low total harmonic distortion. The output of the PFC converter stage is a roughly regulated DC voltage. The PFC converter may be a so-called up-converter. The DC voltage output of the PFC converter is coupled to a first input of a high frequency inverter stage 13 and is also coupled to an input of a control circuit 14. The control circuit 14 controls the switching of a switching device (not shown in FIG. 1) which is a part of the up-converter 12.

The high frequency inverter inverts the DC voltage to a high frequency AC voltage which is amplitude modulated by a 20 to 50 KHz rectified sine wave. Control of lamp current and amplitude modulation are accomplished in this stage. The carrier frequency generated by the high frequency inverter 13 may be, for example, in the range of 1 MHz to 2 MHz.

A control module 20 controls the switching of the switching devices (also not shown in FIG. 1) which are a part of the high frequency inverter 13. The control module includes an oscillator circuit 15 which produces a frequency ($f_s$) or duty cycle (D) sweeping signal which is used to control the amplitude modulation of the high frequency carrier produced in the high frequency inverter 13. This is accomplished by means of a control circuit 16 coupled between the output of the oscillator circuit 15 and a second input of the high frequency inverter 13. The frequency of the sweeping signal may be in the range of 20-50 KHz, or higher.

A demodulator circuit 17 has its input coupled to the output of the high frequency inverter 13 and has an output coupled to an input of a commutator circuit 18. The demodulator circuit is employed in order to obtain the envelope of the amplitude modulated high frequency AC in order to drive the discharge lamp 19 at a modulation frequency in the range of, for example, 20 KHz to 50 KHz.

Assuming at some instant of time the modulation frequency is 20 KHz, then the output signal of the modulator 17 will be a 20 KHz unidirectional half sine wave signal as shown in FIG. 1. In order to drive the discharge lamp 19 with an AC voltage and current, the commutator circuit 18 is inserted between the output of the demodulator circuit and the input to the discharge lamp. It is of course possible to operate the system without the commutator circuit, in which case the discharge lamp is coupled directly to the output of the demodulator. Preferably, the demodulator in that case is one which will produce an AC output voltage and current for the discharge lamp.

The lamp current is monitored and a feedback signal determined thereby is fed back to the control module 20 via a feedback line 21. The control circuit 16 in the control module responds to the feedback signal on line 21 so as to control the frequency or duty cycle of the high frequency inverter in a manner so as to maintain the lamp current relatively constant during normal operation of the discharge lamp.

The electronic ballast system described has been miniaturized since the high frequency inverter operates in the 1-2 MHz range thereby making it possible to reduce the size of any inductors or transformers utilized therein. At the same time, since the lamp current and voltage are in a much lower frequency range, eg., 20 KHz to 50 KHz, the problem of radiation from the discharge lamp and the connection wires, i.e., RFI, is reduced to acceptable levels and without the added cost of expensive RFI suppression techniques.

Figure 2:
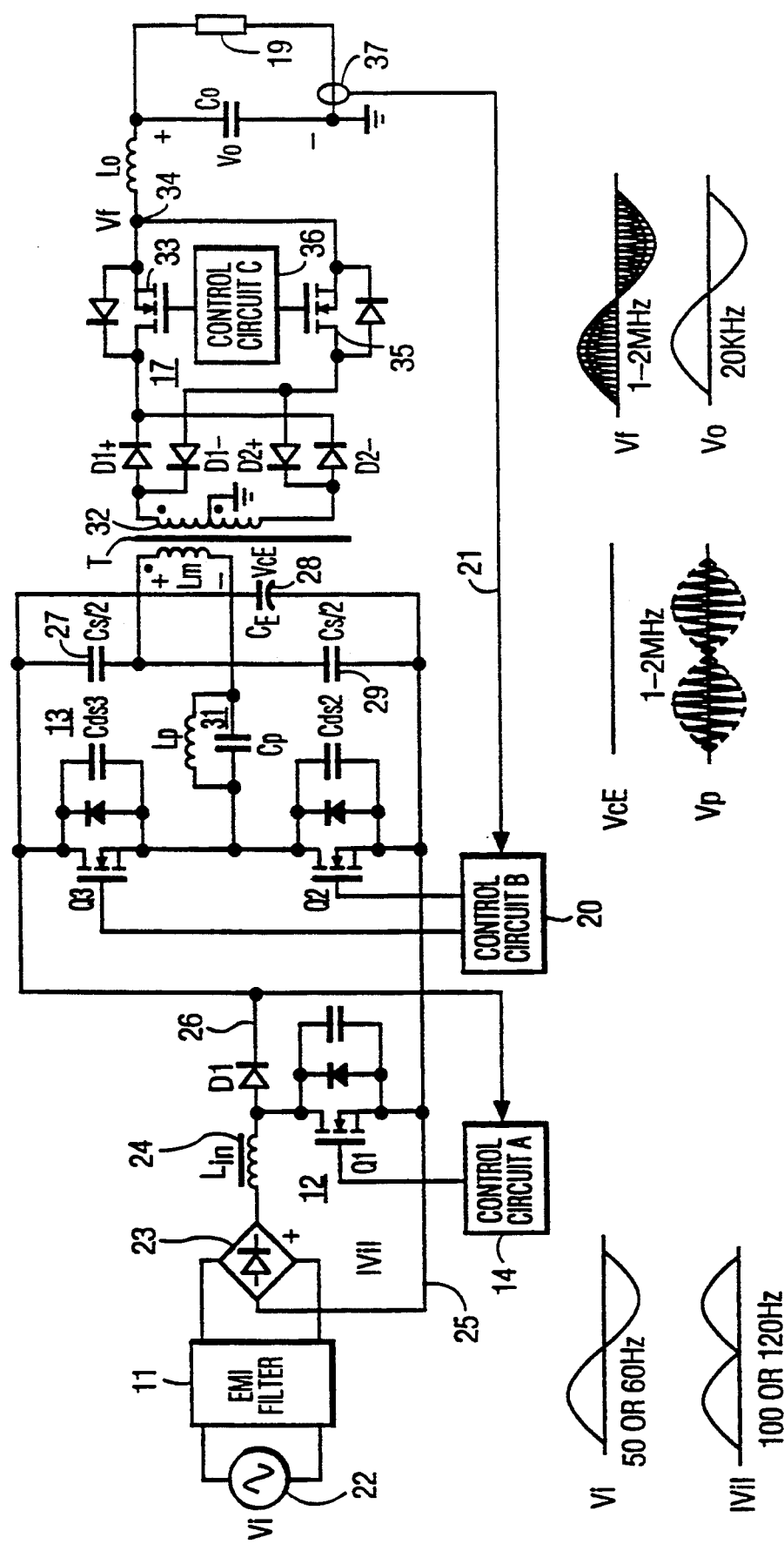
FIG. 2 is a block schematic diagram of the invention shown in FIG. 1, but without the commutator circuit.

FIG. 2 is a schematic circuit of the system shown in FIG. 1, but without the separate commutator circuit 18 since the demodulator shown in FIG. 2 is of a type that directly supplies an AC output voltage, rather than the rectified sinusoidal type waveform of the demodulator 17 shown in FIG. 1. Corresponding reference labels are used in FIG. 2 for circuit elements that perform the same or similar functions to those shown in FIG. 1.

A 50 Hz or 60 Hz sinusoidal AC voltage, $V_i$, is supplied to the EMI filter 11 from the voltage source 22. The output of the EMI filter is connected to input terminals of a rectifier bridge circuit 23, illustrated diagrammatically, and having output terminals connected to an up-converter 12, i.e., a power factor correction converter. The positive (+) output terminal of the bridge rectifier is connected to one end of an inductor 24. The other end of inductor 24 is coupled to the anode of a diode D1 and to the drain of a switching field effect transistor (FET) Q1. The source electrode of FET Q1 is connected to a common line 25 which is connected to the negative (−) output terminal of the bridge rectifier circuit. The inherent diode and the inherent capacitance of the field effect transistor Q1 are shown in the drawing.

The cathode of diode D1 represents the output 26 of the PFC up-converter 12 and is coupled to a control input of the control circuit 14. The output of the control circuit is connected to the gate of switching transistor Q1 and controls the switching thereof. As the up-converter is conventional, a discussion of its operation would be superfluous in the context of the present invention.

The output 26 of the PFC up-converter 12 is also coupled to one input of the high frequency inverter 13, i.e., to the drain of field effect transistor Q3, to one terminal of a capacitor 27 and to one terminal of an output capacitor 28. The line 25 constitutes a common terminal of the high frequency inverter. The source electrode of transistor Q3 is connected to the drain of the field effect transistor Q2 which in turn has its source connected to the common line 25. The gate electrodes of switching transistors Q2 and Q3 receive switching control signals from the output circuit of a control circuit which is a part of the control module 20.

The second (lower) terminal of capacitor 27 is connected to the common line 25 via a series connected capacitor 29. The capacitors 27 and 29 preferably have the same capacitance ($C_s/2$). The junction point between capacitors 27 and 29 is connected to one terminal of the primary winding $L_m$ of a transformer T. The lower terminal of capacitor 28 is connected to the common line 25.

The other (lower) terminal of primary winding $L_m$ is connected into a junction point between field effect transistors Q2 and Q3 via a parallel LC circuit 31 consisting of an inductor $L_p$ and a capacitor $C_p$.

The secondary winding 32 of the transformer T forms a part of the demodulator circuit 17. This demodulator circuit is a so-called inductive type demodulator circuit. The winding sense of the transformer windings is indicated by the conventional dot symbols. The center tap of secondary winding 32 is connected to ground. The top terminal of winding 32 is connected to the anode of a diode D1+ and to the cathode of a diode D1−, while the bottom terminal of this winding is connected to the cathode of a diode D2− and to the anode of a diode D2+. The cathode of diode D1+ is interconnected with the cathode of diode D2+ and the anode of diode D1− is interconnected with the anode of diode D2−.

The cathodes of diodes D1+ and D2+ are connected via a field effect transistor 33 to a terminal 34 at which, in operation, a 1-2 MHz voltage, $V_f$, appears with a modulation envelope of 20 KHz. The anodes of diodes D1− and D2− are connected to terminal 34 via a field effect transistor 35. The internal diodes of the field effect transistors 33 and 35 are shown in the drawing. A control circuit 36 has output lines coupled to respective gate electrodes of the transistors 33 and 35 in order to control the switching thereof.

The terminal 34 is connected to ground via a series LC circuit consisting of inductor $L_0$ and capacitor $C_0$. One end of the discharge lamp 19 is connected to the junction point between the inductor $L_0$ and the capacitor $C_0$ and the other end of the lamp is connected to ground. The filament windings of transformer T for supplying heater current to the filaments of the discharge lamp 19 are not shown in the interest of brevity.

Figure 6:
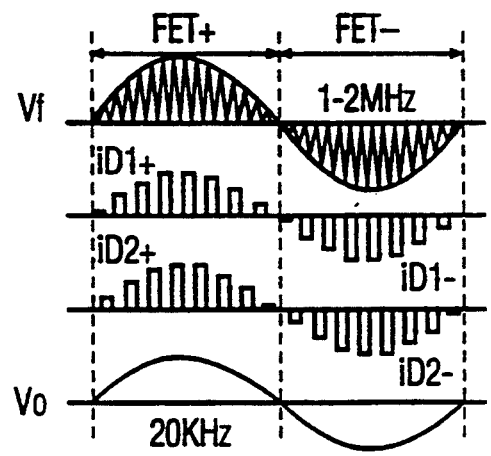
FIG. 6 illustrates some typical voltage and current waveforms of the demodulator circuit shown in FIG. 2.

If the inductor $L_0$ is omitted and the terminal 34 is connected directly to the discharge lamp and to the capacitor $C_0$, we have a so-called capacitive demodulator circuit. FIG. 6 shows some typical voltage and current waveforms for the inductive demodulator circuit shown in FIG. 2.

The lamp current is monitored via conventional means illustrated diagrammatically by means of the element with the reference label 37. A feedback signal proportional to the lamp current is fed back via the line 21 to the control input of the control circuit 20.

The waveforms of the voltages at various labeled reference points in FIG. 2 are also shown as an aid to a better understanding of the invention. The operation of the detailed circuit of FIG. 2 is similar to that described above with reference to FIG. 1. The field effect transistors Q2 and Q3 of the high frequency inverter are switched at the high frequency, 1-2 MHz, by the control circuit 20 under the control of a feedback signal on feedback line 21. These transistors, Q2 and Q3, are preferably switched in accordance with the zero voltage switching principle. The transistors are switched in a complementary fashion, i.e., one is on while the other is off, and vice versa. Both transistors are simultaneously off briefly at the moments of zero voltage switching (ZVS).

The output voltage, $V_{CE}$, across capacitor 28 of the PFC converter 12 is a DC voltage, as shown. The output voltage of the high frequency inverter 13, i.e. the voltage $V_p$, is a 1-2 MHz amplitude modulated voltage, as shown in the drawing. The demodulator voltage, $V_f$, at terminal 34 is shown, as is the resultant 20 KHz sinusoidal demodulation voltage, $V_0$, applied to the discharge lamp 19.

Figure 3:
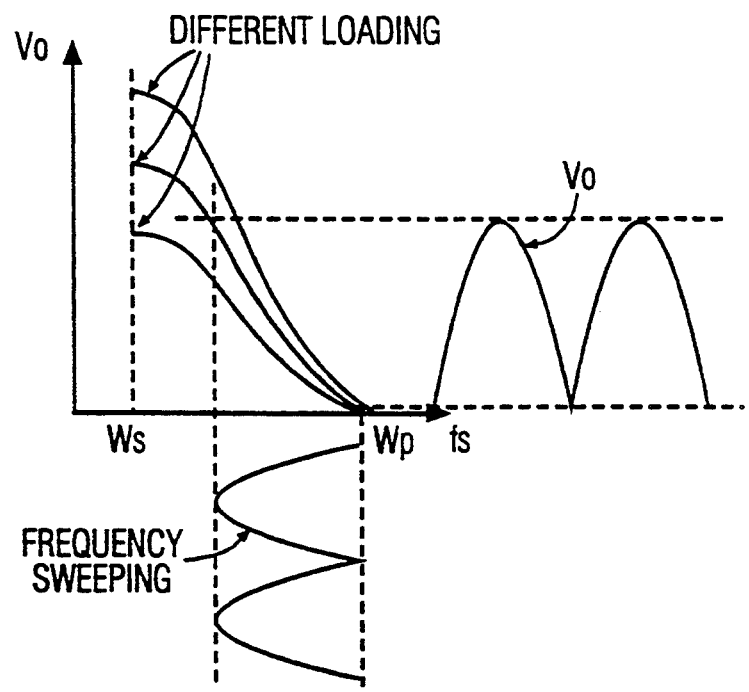
FIG. 3 is a diagram which will assist in understanding the principle of a preferred amplitude modulation technique for use in the invention.

The waveforms of FIG. 3 illustrate the principle of amplitude modulation in the high frequency inverter by the application of a frequency sweeping voltage of 20 KHz to 50 KHz. This is accomplished in the control module 20 (FIG. 1) and will be described in more detail with reference to FIGS. 4 and 5 below.

Figure 4:
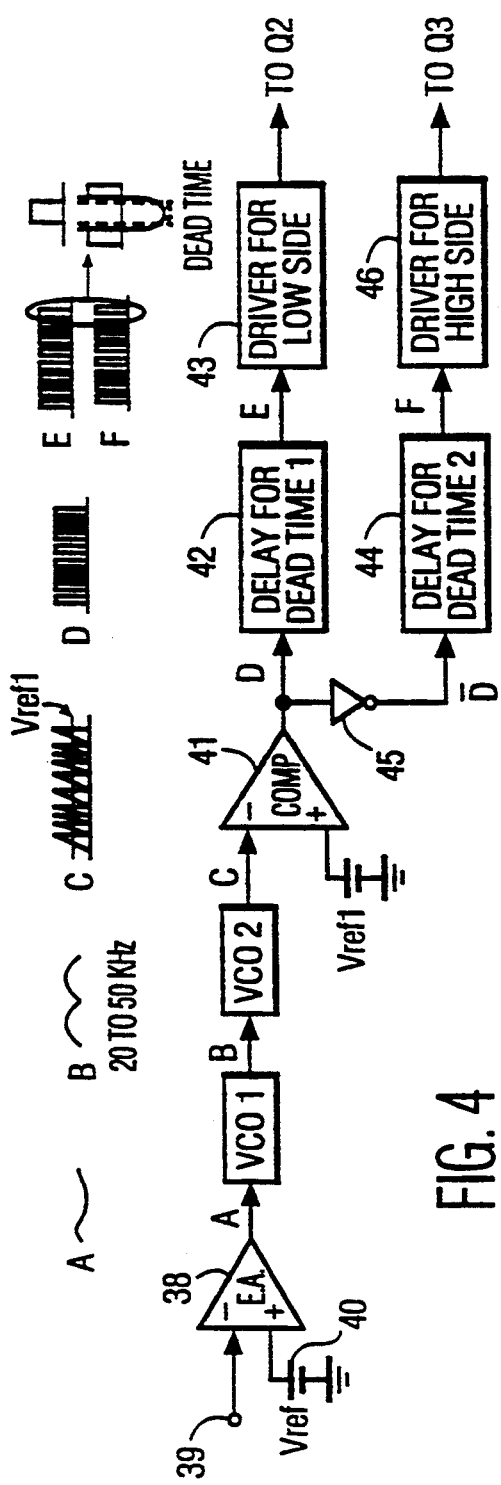
FIG. 4 is a block diagram of a first control circuit for use in the invention shown in FIGS. 1 and 2.

FIG. 4 is a functional block diagram of the control module 20 illustrating the novel frequency sweeping control feature of the invention. An input terminal 39 receives the lamp current feedback signal (via feedback line 21 in FIG. 1). A comparator circuit 38 receives the feedback signal from the discharge lamp 19 via the input terminal 39 which is connected to the inverting input (−) of the comparator. The noninverting input (+) of the comparator circuit is connected to a reference voltage, $V_{ref}$, illustrated for convenience as a battery 40.

The output voltage of the comparator circuit 38, having the waveform A in the drawing, is supplied to a first voltage controlled oscillator, VCO1. The first voltage controlled oscillator produces at its output a rectified 20 KHz to 50 KHz voltage waveform B, as shown. The output voltage B of VCO1 is supplied to the input of a second voltage controlled oscillator, VCO2, which in turn produces a triangular output voltage shown as waveform C whose frequency varies in accordance with the modulation sweep frequency.

The voltage waveform C is in turn applied to the inverting input (−) of a second comparator circuit 41. The non-inverting input (+) of comparator 41 is connected to a source of DC reference voltage, $V_{ref1}$, also illustrated as a battery having one terminal connected to ground. The comparator circuit 41 functions as a square wave converter and produces at its output the rectangular pulse waveform D which also is frequency modulated at the modulation frequency.

The frequency modulated pulse-type voltage waveform D is applied directly to a delay circuit 42 which operates to provide a delay for the deadtime when both transistors Q2 and Q3 in the high frequency inverter (FIG. 2) are simultaneously switched off (zero voltage switching). This is indicated by the frequency modulated output voltage rectangular waveform E in the drawing. The output voltage E is applied to a low side driver circuit 43 which in turn supplies the switching signals for the gate electrode of FET Q2 in the high frequency inverter circuit 13 (FIG. 2).

The output voltage, waveform D, of the rectangular wave converter 41 also is applied to the input of a delay circuit 44, similar to delay circuit 42, but via an inverter circuit 45 since the FET Q3 (FIG. 2) operates in a complementary fashion relative to the FET Q2. The delay circuit 44 functions in the same way as the delay circuit 42, but 180° out of phase therewith.

The frequency modulated output voltage, waveform F, is supplied to the input of the high side driver circuit 46 which in turn supplies the switching signals to the gate of field effect transistor Q3 in the high frequency inverter circuit 13 (FIG. 2). The inverter 45 ensures that the switching transistors Q2 and Q3 in the high frequency inverter are driven 180° out of phase. The frequency sweeping modulation signal controls the amplitude modulation in the high frequency inverter 13.

Figure 5:
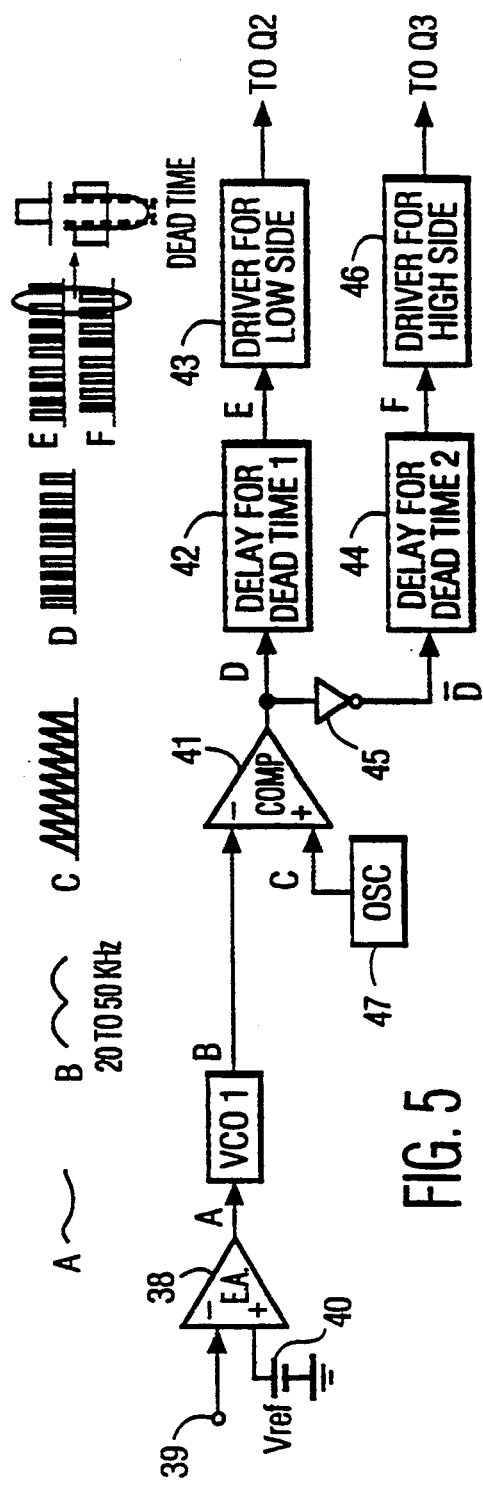
FIG. 5 is a block diagram of a second control circuit for use in the invention shown in FIGS. 1 and 2.

FIG. 5 illustrates an alternative modulation technique for the control module 20. The block diagram of FIG. 5 produces a duty cycle sweeping control signal for the switching transistors Q2 and Q3 of the high frequency inverter. As in the circuit of FIG. 4, the lamp feedback signal is applied to input terminal 39 which is connected to the inverting input (−) of a comparator circuit 38. The non-inverting input (+) is again connected to ground via a DC source of reference voltage, illustrated as a battery 40. The output voltage waveform A of the comparator is coupled to the input of the voltage controlled oscillator, VC01. The 20 KHz–50 KHz output rectified waveform B of VC01 is coupled to the inverting input (−) of the comparator circuit 41.

An oscillator circuit 47 supplies a constant frequency triangular output voltage waveform C to the non-inverting input (+) of the comparator circuit 41. The comparator circuit responds to the voltage waveforms B and C supplied to its inputs to produce at its output a train of rectangular pulses D modulated in the frequency range of 20 KHz to 50 KHz. The output voltage waveform D is supplied directly to the delay circuit 42 and to the delay circuit 44 via an inverter circuit 45. The delay circuits each supply a train of respective output voltage rectangular pulses E and F to the low side driver 43 and to the high side driver 46, respectively. The driver circuits 43 and 46 in turn supply the gate drive switching voltages to the transistors Q2 and Q3, respectively, in the high frequency inverter circuit 13 (FIG. 2). The duty cycle sweeping modulation signal produced in the circuit of FIG. 5 controls the amplitude modulation of the high frequency inverter circuit 13.

Although preferred embodiments of the present invention have been shown and described herein, it will be obvious that such embodiments are provided by way of example only. Numerous variations, changes and substitutions will occur to those skilled in the art without departing from the true scope and spirit of the invention. For example, the power factor correction converter and high frequency inverter can be a resonant converter or a pulse width modulated (PWM) zero voltage resonant transition converter. The commutator circuit can be a half-bridge commutator or a full-bridge commutator. Accordingly, it is to be understood that the scope of the invention is to be determined by the appended claims which are intended to cover all modifications falling within the spirit and scope of the invention.

What is claimed is:

1. An electronic ballast circuit comprising:
    a pair of input terminals for connection to a source of supply voltage for the electronic ballast circuit,
    means for generating a high frequency carrier signal,
    means for coupling said carrier signal generating means to said input terminals,
    means coupled to said carrier signal generating means for modulating the high frequency carrier signal with a relatively lower frequency signal,
    a demodulator circuit having its input coupled to an output of the carrier signal generating means to receive therefrom a modulated carrier signal modulated by the lower frequency signal, said demodulator circuit having an output at which said lower frequency modulation signal appears,
    a circuit output terminal for connection to a discharge lamp, and
    second means for coupling the demodulation circuit output to said circuit output terminal so that a connected discharge lamp will be energized by a voltage and current of said lower frequency.

2. An electronic ballast circuit as claimed in claim 1 wherein said coupling means comprises a power factor correction converter and said pair of input terminals are intended for connection to a source of AC voltage of approximately 60 Hz.

3. An electronic ballast circuit as claimed in claim 2 wherein said carrier signal generating means comprises;
    a high frequency inverter including at least one switching transistor, and
    said modulating means comprises a control circuit for supplying a modulation control signal to a control electrode of said at least one switching transistor, said modulating means control circuit having an input which receives a control signal that is determined by lamp current thereby to control the high frequency inverter in a manner so as to ballast the lamp current.

4. An electronic ballast circuit as claimed in claim 3 wherein said control circuit of the modulating means includes means for deriving a frequency sweeping modulation control signal or a duty cycle sweeping modulation control signal.

5. An electronic ballast circuit as claimed in claim 1 wherein said carrier signal generating means comprises;
    a high frequency inverter including at least one switching transistor, and
    said modulating means comprises a control circuit for supplying a modulation control signal to a control electrode of said at least one switching transistor, said modulating means control circuit having an input which receives a control signal that is determined by lamp current thereby to control the high frequency inverter in a manner so as to regulate the lamp current.

6. An electronic ballast circuit as claimed in claim 5 wherein said carrier signal is amplitude modulated at the lower frequency, and
    said control circuit of the modulating means includes means for deriving a frequency sweeping modulation control signal or a duty cycle sweeping modulation control signal.

7. An electronic ballast circuit as claimed in claim 1 wherein said carrier signal generating means includes a high frequency inverter comprising;
    first and second switching transistors serially connected across first and second terminals of the high frequency inverter and with a first node therebetween,
    first and second capacitors serially connected across said first and second high frequency inverter terminals and with a second node therebetween,
    a parallel LC circuit,
    an inductor,
    means connecting said inductor and said parallel LC circuit in a series circuit between said first and second nodes, and
    a further capacitor connected between said first and second terminals of the high frequency inverter.

8. An electronic ballast circuit as claimed in claim 1 wherein said modulating means comprises a control circuit for deriving a modulation control signal, said control circuit including a voltage controlled oscillator controlled by a control signal derived from the lamp current and operative to produce an output signal that sweeps in frequency between approximately 20 KHz and 50 KHz.

9. An electronic ballast circuit as claimed in claim 8 wherein said control circuit further comprises a second voltage controlled oscillator coupled in cascade with the first voltage controlled oscillator to produce at an output of the second voltage controlled oscillator a signal that varies in frequency in accordance with the output signal frequency of the first voltage controlled oscillator.

10. An electronic ballast circuit as claimed in claim 9 wherein said control circuit further comprises a comparator having a first input coupled to the output of the second voltage controlled oscillator and a second input coupled to a source of reference voltage, and
 first and second delay circuits coupled to an output of the comparator.

11. An electronic ballast circuit as claimed in claim 8 further comprising a comparator having a first input coupled to an output of the voltage controlled oscillator to receive its said output signal and a second input coupled to an output of an oscillator circuit, and
 means coupling first and second delay circuits to an output of the comparator.

12. An electronic ballast circuit as claimed in claim 1 wherein said coupling means comprises a power factor correction converter and said pair of input terminals are intended for connection to a source of AC voltage,
 said carrier signal generating means comprises a high frequency inverter including first and second switching transistors, and
 said modulating means comprises a control circuit for supplying modulation control signals to control electrodes of said first and second switching transistors whereby a high frequency signal of approximately 1–2 MHz amplitude modulated in a frequency range of approximately 20 KHz to 50 KHz is supplied to the demodulator circuit.

13. A method of operating a discharge lamp comprising:
 generating a high frequency amplitude modulated operating voltage wherein the modulation voltage is at a modulation frequency at least one order of magnitude lower than a high frequency carrier frequency of said operating voltage,
 demodulating said high frequency amplitude modulated operating voltage to derive a voltage at said modulation frequency, and
 applying said derived voltage at said modulation frequency to a discharge lamp.

* * * * *